United States Patent
Fang et al.

(10) Patent No.: US 10,724,605 B2
(45) Date of Patent: Jul. 28, 2020

(54) MAIN DRIVE DEVICE OF PLANOCENTRIC SET

(71) Applicants: Zupeng Fang, Nanjing (CN); Dan Fang, Shanghai (CN); Lei Wang, Shanghai (CN); Fang Fang, Nanjing (CN); Yafeng Zhao, Nanjing (CN)

(72) Inventors: Zupeng Fang, Nanjing (CN); Dan Fang, Shanghai (CN); Lei Wang, Shanghai (CN); Fang Fang, Nanjing (CN); Yafeng Zhao, Nanjing (CN)

( * ) Notice: Subject to any disclaimer, the term of this patent is extended or adjusted under 35 U.S.C. 154(b) by 4 days.

(21) Appl. No.: 16/100,998

(22) Filed: Aug. 10, 2018

(65) Prior Publication Data
US 2019/0085942 A1 Mar. 21, 2019

(30) Foreign Application Priority Data
Sep. 18, 2017 (CN) .......................... 2017 1 0840441

(51) Int. Cl.
*F16H 1/32* (2006.01)
*H02K 7/00* (2006.01)
*H02K 7/18* (2006.01)
*B60K 17/04* (2006.01)
*B64D 35/02* (2006.01)
*H02K 7/116* (2006.01)
*F03D 15/00* (2016.01)
(Continued)

(52) U.S. Cl.
CPC .............. *F16H 1/32* (2013.01); *B60K 17/04* (2013.01); *B64D 35/02* (2013.01); *H02K 7/006* (2013.01); *H02K 7/116* (2013.01); *H02K 7/1846* (2013.01); *B61C 9/38* (2013.01); *B63H 23/02* (2013.01); *B63H 2023/0283* (2013.01); *F03D 15/00* (2016.05); *F05B 2260/40311* (2013.01)

(58) Field of Classification Search
CPC ....................................................... F16H 1/32
See application file for complete search history.

(56) References Cited

U.S. PATENT DOCUMENTS

| 9,022,896 B2 * | 5/2015 | Fang | ......................... F16H 1/32 475/162 |
| 2006/0147142 A1 * | 7/2006 | Bezyaiko | ................ F16C 19/50 384/521 |

(Continued)

OTHER PUBLICATIONS

M.B. Peterson, et al; "Wear Control Handbook"; American Society of Mechanical Engineers; 1980; 3 pgs total.

*Primary Examiner* — David R Morris
(74) *Attorney, Agent, or Firm* — Oliff PLC (57) ABSTRACT

A main drive device of a planocentric set for three armed forces, including inner ring, outer ring, rolling column between the inner and outer rings at a side closer to the inner ring, and rolling pin shaft pairs installed between the inner and outer rings at a side closer to the outer ring; the inner ring is installed on an eccentric shaft and rotates driven by the eccentric shaft; the eccentric shaft is driven by a prime mover; when the rolling column is in contact with the inner ring, it contacts one of the two neighboring rolling pin shaft pairs to transmit power to the rolling pin shaft pairs in clockwise and counter-clockwise rotation; the rolling pin shaft pair drives the outer ring to rotate; the outer ring drives a planet wheel spoke to rotate, to drive a planocentric set planet wheel, and implement drive of a planocentric set.

10 Claims, 5 Drawing Sheets

(51) Int. Cl.
*B61C 9/38* (2006.01)
*B63H 23/02* (2006.01)

(56) References Cited

U.S. PATENT DOCUMENTS

| | | | |
|---|---|---|---|
| 2013/0059693 A1* | 3/2013 | Fang | F16H 1/32 |
| | | | 475/180 |
| 2017/0314644 A1* | 11/2017 | Sugishita | F16H 1/32 |
| 2018/0031079 A1* | 2/2018 | Yoshida | F16H 1/32 |

* cited by examiner

FIG. 12

MAIN DRIVE DEVICE OF PLANOCENTRIC SET

BACKGROUND

Technical Field

The present invention relates to a mechanical drive device, and in particular, to a drive element that is used in a drive device of a planocentric set and that can directly transfer power to a planet wheel; and specifically, to a main drive device of a planocentric set that is mainly applied to three armed forces equipment for decelerating or accelerating a speed at a high speed ratio.

Related Art

Currently, in the prior art, engaging pairs of a planocentric set and a cycloidal pin wheel all have a complex structured output mechanism, for example, a pin shaft-type output mechanism and a slider-type output mechanism. The mechanisms have common disadvantages of complex structure, a large additional resistance, low efficiency $\eta \leq 90\%$, and small power $N \approx 100$ KW.

In the prior art, a pure inner engaging pair of a planocentric set has an obvious advantage of a small contact stress, which is usually smaller than 10 kg/mm². However, a contact stress of a corresponding outer engaging pair is approximately 100 kg/mm² (a double-gear NGW accelerator in a 750-KW natural wind turbine).

In the prior art, a relationship between a contact stress of a gear and a service life of a gear surface is approximately that when the contact stress is reduced by one time, the service is increased by 100 times. This is equivalent to that a service life contrast of inner engaging to outer engaging at the same condition is approximately 10 to the $3.2^{th}$ power. For details, refer to *Wear Controlled Hand book*.

In the prior art, a service life (an NGW outer engaging pair of double gears) of a helicopter after the helicopter is fueled out is <40 minutes. If the helicopter cannot return to the base as scheduled, a crash accident may occur. For details, refer to the paper *Research And Development On Main Reducer Of Foreign Military Helicopter* written by Ding Wenqiang from China Institute of Aeronautical power.

In the prior art, for general externally engaged NGWs of the same power, noise of a reducer is level 80≈85 dB, and noise of an engaging pair of a planocentric set is approximately 65 dB to 70 dB.—From sample test by vehicle inventors in the eighties.

In the prior art, a rolling shaft only has a function of bearing a centric (shaft) stress, but does not have a function of transferring a torque between an inner ring and an outer ring.

In the prior art, the 1:1 function beyond a contrast of an inner ring to an outer ring of a clutch cannot meet requirements on translation, differential motion and transferring a torque between each other in an eccentric planet wheel system.

In the prior art, a NEW externally engaged pair used in a reducer of a separate electrically-driven device in an automobile wheel has such disadvantages as a large externally-engaged contact stress, high noise, and a short service life.

An NGW or an externally engaged parallel-shaft device used by a main drive device in a ship or a warship in the prior art has disadvantages of high noise, a large engaged contact stress, a multilevel and large volume.

A double-gear NGW externally engaged pair only used by an existing natural wind accelerator has many foregoing disadvantages and shortcomings. In the prior art, a torque cannot be transferred and no buffer device exists between an inner ring and an outer ring of an arm bearing of a planocentric set pair. For a high-speed train, an externally engaged pair is used for main drive, and no buffer device is configured. However, a conventional automobile is started by using a hydraulic converter, there is no buffer facility for driving of an electrically-powered automobile, a system shape change amount of positive driving is limited, and a compelling force is larger than that of a resilient buffer structure in the present invention by dozens of times.

In the prior art, if motor driving modes of a high-speed train and an automobile are that no speed reducing device is used and the high-speed train and the automobile are directly driven, a power torque is excessively small and a starting time is excessively long, and it is impossible to use a low-speed motor due to a limit on the appearance dimension.

SUMMARY

In view of the problem that a driving device of a planocentric set has a complex power input structure and poor reliability, an objective of the present invention is to design a rolling bearing type main drive device that can cancel an existing driving structure, directly use planet wheel bearing drive power, and drive an inner ring and an outer ring of the planet wheel to transfer a torque.

Figure 1:
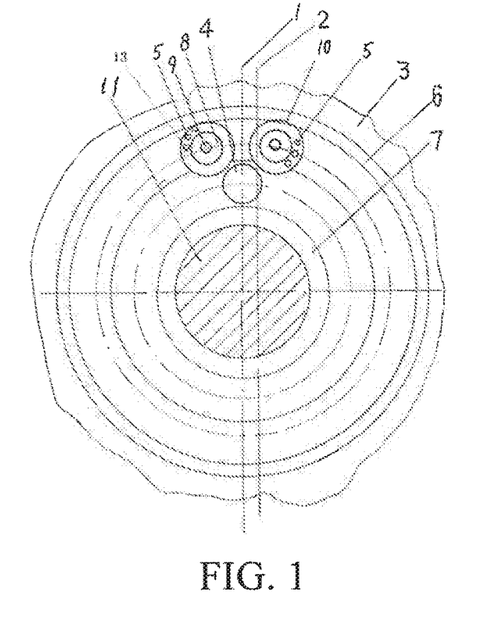
FIG. 1 is a front view of an actively loaded rolling bearing of an eccentric shaft 11 and an inner ring 7.

A first technical solution in the present invention is:

a main drive device of a planocentric set for three armed forces, installed on a bearing position of a planocentric set planet wheel, and directly transferring power of a prime mover to the planet wheel to drive the planet wheel to implement differential rotation, where the main drive device of a planocentric set for three armed forces mainly includes an inner ring 7, an outer ring 6, a rolling column 4, and rolling pin shaft pairs 13; the inner ring 7 is installed on an eccentric shaft 11 and rotates driven by the eccentric shaft 11; the eccentric shaft 11 is driven by the prime mover; the rolling column 4 is installed between the inner ring 7 and the outer ring 6 and at a side closer to the inner ring 7; the rolling pin shaft pair 13 is installed between the inner ring 7 and the outer ring 6 and at a side closer to the outer ring 6; when the rolling column 4 is in contact with the inner ring 7 to transfer the power, the rolling column 4 is in contact with one of the two neighboring rolling pin shaft pairs 13 to transmit the power to the rolling pin shaft pairs 13 in clockwise rotation and counter-clockwise rotation; the rolling pin shaft pair 13 drives the outer ring 6 to rotate; the outer ring 6 drives a planet wheel spoke 3 to rotate, to drive the planocentric set planet wheel to perform translation, and implement speed-deceleration driving of a planocentric set, as shown in FIG. 1.

The rolling pin shaft pair 13 includes a pin shaft 8 and a cycle of equispaced rolling pins 5 that are disposed in a cylinder 10 and in contact with the cylinder 10, an inner edge of the rolling pin 5 is in contact with an outer edge of the pin shaft 8, and two terminal shafts 9 of the pin shaft 8 are disposed in open pores at two ends of the outer ring 6.

The inner ring 7 is installed on the eccentric shaft 11 through interference fit.

Figure 12:
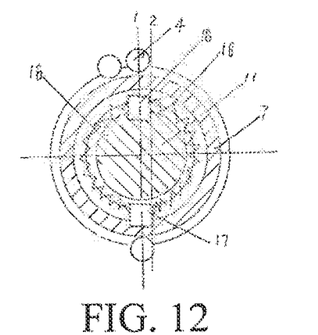
FIG. 12 is a sectional view of FIG. 11 along A-A.

The inner ring 7 is connected to the eccentric shaft 11 by using an active key 17, a passive key 18, and springs 16, the active key 17 is fixed on the eccentric shaft 11, the passive key 18 is fixed on the inner ring 7, and two ends of each of the two springs 16 are respectively connected to two side surfaces of the active key 17 and two side surfaces of the passive key 18, to implement buffer driving between the eccentric shaft 11 and the inner ring, as shown in FIG. 12.

Figure 2:
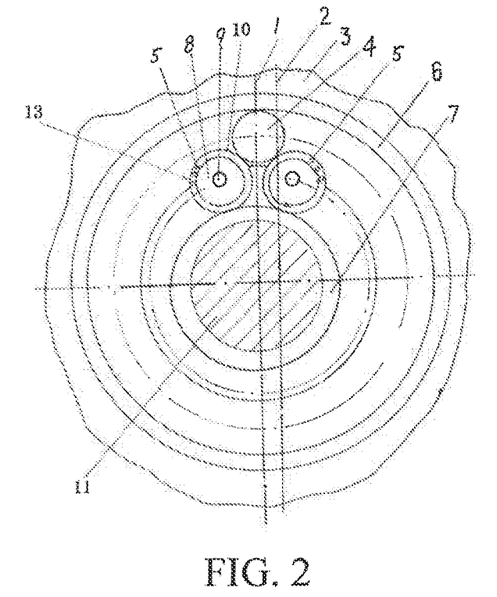
FIG. 2 is a front view of a rolling bearing actively loaded with a planet wheel spoke 3 and an outer ring 6 as active members.

A second technical solution in the present invention is:

a main drive device of a planocentric set for three armed forces, where the main drive device of a planocentric set for three armed forces mainly includes an inner ring 7, an outer ring 6, a rolling column 4, and rolling pin shaft pairs 13; the inner ring 7 is installed on an eccentric shaft 11; the rolling column 4 is installed between the inner ring 7 and the outer ring 6 and at a side closer to the outer ring 6; the rolling pin shaft pair 13 is installed between the inner ring 7 and the outer ring 6 and at a side closer to the inner ring 7; the outer ring 6 is connected to a spoke 3 of a planocentric set planet wheel, and drives the rolling column 4 to rotate; when the rolling column 4 is in contact with the outer ring 6 to transfer power, the rolling column 4 is in contact with one of the two rolling pin shaft pairs 13 to transmit the power to the rolling pin shaft pairs 13 in clockwise rotation and counter-clockwise rotation; the rolling pin shaft pair 13 drives the inner ring 7 to rotate, and the inner ring 7 drives the eccentric shaft 11 to rotate at a high speed, to form a speed-acceleration device of a planocentric set, as shown in FIG. 2, The rolling pin shaft pair 13 includes a pin shaft 8 and a cycle of equispaced rolling pins 5 that are disposed in a cylinder 10 and in contact with the cylinder 10, an inner edge of the rolling pin 5 is in contact with an outer edge of the pin shaft 8, and two terminal shafts 9 of the pin shaft 8 are disposed in open pores at two ends of the outer ring 6.

The outer ring 6 is connected to the spoke 3 of the planocentric set planet wheel through interference fit.

The outer ring 6 is connected to the spoke 3 of the planocentric set planet wheel by using an active key 17, a passive key 18, and springs 16; the active key 17 is fixed on the spoke 3 of the planocentric set planet wheel, the passive key 18 is fixed on the outer ring 6, and two ends of each of the two springs 16 are respectively connected to two side surfaces of the active key 17 and two side surfaces of the passive key 18, to implement buffer driving between the spoke 3 and the outer ring 6.

A third technical solution in the present invention is:

a main drive device of a planocentric set for three armed forces, applied to any one of the following speed deceleration or acceleration devices:

1) a speed deceleration device powered by a high-frequency high-speed alternating electromotor having a hollow rotor shaft, or a motor that uses a hollow coaxial shaft 26 as a union body and is loaded with a spoke of a rolling bearing-type automobile/armored vehicle, or driven by a gasoline/diesel machine;

2) a reducer of a planocentric set that is applied to a high-speed train main drive wheel pair powered by a high-frequency high-speed electromotor having a hollow rotor shaft, that uses a hollow motor rotor and an eccentric shaft coaxial shaft 26 of a planocentric set as a union body, and loaded with a rolling bearing pair;

3) a reducer of a planocentric set applied to a propeller of a ship or a warship, having a hollow main shaft, using a high-frequency high-speed electromotor or dynamotor having a hollow rotor shaft and an eccentric shaft coaxial shaft 26 of a planocentric set, loaded with a rolling bearing pair;

4) a serial reducer that is commonly used in a cycloidal pin wheel and loaded with a rolling bearing pair 14 and a general-type serial reducer of a planocentric set;

5) a main drive reducer applied to a propeller of a helicopter and whose impulsion is 20000 r.p.m, a gas turbine, or a high-speed electromotor;

6) an electrically device, applied to an electrically hub of a planocentric set of an automobile having two gears of speed, formed by a friction pair driven by an inner-and-outer ring electromagnet formed by a hollow coaxial shaft 26 and a radial component of an external diameter of an inner gear ring; or 7) a speed acceleration device of a planocentric set used in a natural wind or wind gathering wind power station.

Details are provided as follows:

Provided is a rolling bearing device applied to a planocentric set at an eccentric wheel position of an engaging pair of a cycloidal pin wheel. A torque may be transferred between an inner ring 7 and an outer ring 6, and a spring 16 having stretching and compression performance is disposed between the inner ring 7 and the eccentric shaft 11. There is a cycle of circumferentially equispaced rolling columns 4 and another cycle of circumferentially equispaced rolling pin shaft pairs 13 between a radial outer cavity of the inner ring 7 and a radial inner cavity of the outer ring 6. The pin shaft pairs 13 include a pin shaft 8 and a cycle of equispaced rolling pins 5 that are disposed in a cylinder 10 and in contact with the cylinder 10. An inner edge of the rolling pin 5 is in contact with an outer edge of the pin shaft 8, and two terminal shafts 9 of the pin shaft 8 are disposed in ⊓-shaped open pores at two ends of the outer ring 6. An outer edge of the rolling column 4 is respectively in contact with an outer edge of the cylinder 10 in each of the left and the right rolling pin shaft pair 13. An inner edge of the rolling column 4 is in contact with an outer edge of the inner ring 7. Two springs 16 are disposed at each of the two ends of the eccentric shaft 11 in the inner ring 7. Two ends of the springs 16 are fixedly connected to the keys 17 and 18, to form a speed deceleration device of a planocentric set or a cycloidal pin wheel that uses the inner ring 7 as an active member, has buffer performance and is loaded with a rolling bearing pair.

There is a cycle of circumferentially equispaced rolling columns 4 and another cycle of circumferentially equispaced rolling pin shaft pairs 13 between a radial outer cavity of the inner ring 7 and a radial inner cavity of the outer ring 6. The pin shaft pairs 13 include a pin shaft 8 and a cycle of equispaced rolling pins 5 that are disposed in a cylinder 10 and in contact with the cylinder 10. An inner edge of the rolling pin 5 is in contact with an outer edge of the pin shaft 8, and two terminal shafts 9 of the pin shaft 8 are disposed in ⊔-shaped open pores at two ends of the inner ring 7. An inner edge of the rolling column 4 is respectively in contact with an outer edge of the cylinder 10 in each of the left and the right rolling pin shaft pair 13. An outer edge of the rolling column 4 is in contact with an inner edge of the inner ring 7. Two springs 16 are disposed at two ends of the outer ring 6 and the spoke 3. Two ends of the springs 16 are fixedly connected to the keys 17 and 18, to form a speed acceleration device of a planocentric set or a cycloidal pin wheel that uses the planet wheel spoke 3 and the outer ring 6 as active members, has buffer performance and is loaded with a rolling bearing pair.

The loaded rolling bearing pair may be a structure that purely transfer a torque but does not have a buffer spring, or may be a structure that can both transfer a torque and has a buffer spring.

For the loaded rolling bearing pair, when the inner ring 7 is an active body and the outer ring 6 is a passive body, the rolling columns 4 are evenly disposed at a radial outer edge of the vehicle inner ring 7, the outer edge of the rolling column 4 is respectively in contact with an outer edge of the left and right cylinder 10, and the terminal shafts 9 are disposed in ⊓-shaped open pores at two ends of the outer ring 6.

For the loaded rolling bearing pair, when the outer ring 6 is an active member, the rolling columns 4 are evenly installed on the inner radial circumference of the outer ring 6 and the rolling columns 4 are respectively in contact with the outer edge of the left and right cylinder 10. The shaft end 9 of the rolling pin shaft pair is installed in ⊔-shaped open pores at two ends of the inner ring 7.

The outer ring 6 of the loaded rolling bearing pair is installed at the center of a planet wheel spoke in a planocentric set or a cycloidal pin wheel engaging pair having an eccentric wheel 11.

The planocentric set engaging pair or a cycloidal pin wheel engaging pair loaded with a rolling bearing does not need to be provided with a most compact engaging pair of highest efficiency of an output mechanism. The planocentric set engaging pair and the cycloidal pin wheel engaging pair loaded with a rolling bearing pair has a function of rotating clockwise or counter-clockwise and has buffer performance. The planocentric set engaging pair loaded with the rolling bearing pair is more suitable to be applied to an automobile hub motor, independent driving of wheels of a high-speed train, and main rotating of a propeller airplane of a helicopter to replace the double-gear NGW planetary set in the prior art which has a disadvantage that a friction service life of a rear wheel is L≤40 minutes when the helicopter is fueled out. The a planocentric set installed with a rolling bearing pair has large power and high efficiency, and a low-noise engaging pair is suitable for a titanic warship, a ship, a submarine and a heavy vehicle. The speed-acceleration type planocentric set engaging pair installed with a rolling bearing is applied to a speed-accelerator of a natural wind machine, a speed-accelerator, and a wind gathering architecture group and a wind gathering wind power station in a wild structure group. The planocentric set installed with the rolling bearing is applied to a cycloidal pin wheel generaltype speed acceleration and deceleration series.

The beneficial effects of the present invention are as follows:

The rolling bearing designed according to the present invention, loaded with a buffer device, and capable of bearing a radial and axial force and transferring a torque between the inner ring 7 and the outer ring 6 is disposed at a bearing position of a rotating arm of a conventional planocentric set and a planet wheel having a cycloidal pin wheel. Therefore, any output mechanism can be canceled, so that a smallest and simplest appearance and highest rotating efficiency can be obtained. A series of products having a planocentric set and a cycloidal pin wheel whose η≥97% is more suitable for gears of independent electrically-driven device such as an automobile and a high-speed train device, and a main rotating speed-deceleration device applied to a large-scale warship, a ship, a submarine, a helicopter, and a propeller airplane is improved to a new marked stage. In addition, the present invention may further be applied to a conventional or wind gathering-type speed-acceleration device mainly driven by wind and electricity, and starting load is buffered to ⅕₀that of positive rotation.

According to the present invention, the structure of a speed deceleration mechanism can be simplified, the dimension is dramatically reduced, and the driving efficiency is revolutionarily improved.

The present invention is secure and convenient in use.

According to the present invention, a revolution is made on a conventional bearing, the structure of a planocentric set device is simplified, and mass component can be omitted in production, thereby reducing production difficulty and costs. The present invention is especially beneficial for improving quality if products for armed forces and improving mechanical performance.

1: Central line of an eccentric shaft 11; 2: Axial line of an original point around which the eccentric shaft 11 rotates; 3: Planet wheel spoke of a planocentric set or a cycloidal pin wheel; 4: Rolling column; 5: Rolling pin; 6: Outer ring; 7: Inner ring; 8: Pin shaft; 9: Shaft end; 10: Cylinder; 11: Eccentric shaft; 12: Eccentric wheel rotating origin axis; 13: Rolling pin shaft pair; 14: Rolling bearing pair loaded with an eccentric shaft (or a hollow eccentric shaft) as an active body (refer to FIG. 1 for details); 15: Rolling bearing pair loaded with a planet wheel spoke 3 as an active member (an eccentric wheel may be solid or hollow and refer to FIG. 2 for details); 16: Stretch or compress a concurrent spring; 17: Start key; 18: Active key; 19: Guard board; 20: Screw; 21: Inner gear ring; 22: Planet wheel; 23: Automobile wheel; 24: Automobile wheel spoke; 25: High-frequency high-speed alternating electromotor having a hollow rotor shaft; 26:

Hollow coaxial shaft of a hollow rotor shaft of a high-frequency high-speed prime power device and a hollow eccentric wheel of a planocentric set; 27: Train wheel; 28: Train pair wheel through shaft; 29: Automobile pair wheel through shaft; 30: Electromotor; 31: Propeller; 32: Hollow main shaft; and 33: Blade spiral angle adjustment bar.

DETAILED DESCRIPTION

The following further describes the present invention with reference to the accompanying drawings and embodiments.

Embodiment 1

The embodiment 1 is shown in FIG. 1, FIG. 3, FIG. 11, and FIG. 12.

Figure 3:
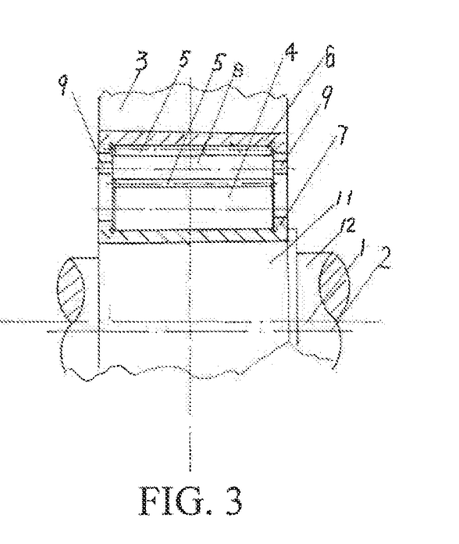
FIG. 3 is an axial sectional view of FIG. 1.
Figure 4:
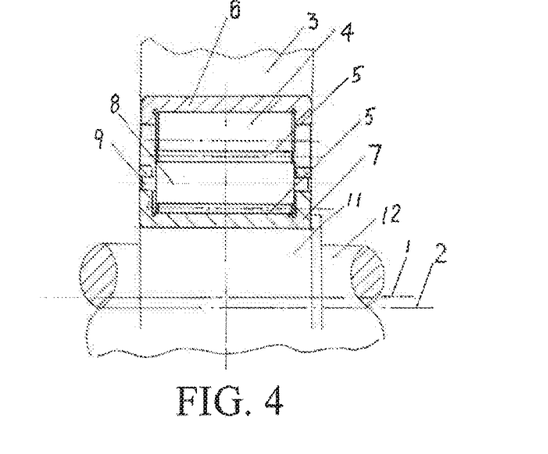
FIG. 4 is an axial sectional view of FIG. 2.
Figure 11:
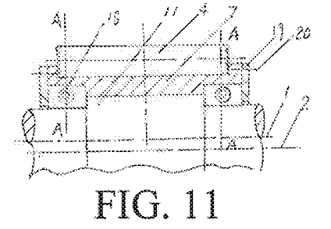
FIG. 11 is an axial sectional view of transferring a torque by an active member by using an inner ring 7 as a passive member and an eccentric shaft 11 as an active member loaded with a rolling bearing pair having a buffer spring of a planet engaged pair of a planocentric set to the inner gear by using the spring 16.

A main drive device of a planocentric set for three armed forces is provided. The main drive device of a planocentric set is installed at a bearing position of a planocentric set planet wheel and directly transfers power of a prime mover to the planet wheel to drive the planet wheel to implement differential rotation. The main drive device of a planocentric set mainly includes an inner ring 7, an outer ring 6, a rolling column 4, and rolling pin shaft pairs 13. The inner ring 7 is installed on an eccentric shaft 11 and rotates driven by the eccentric shaft 11. The eccentric shaft 11 is driven by the prime mover. The rolling column 4 is installed between the inner ring 7 and the outer ring 6 and at a side closer to the inner ring 7. The rolling pin shaft pair 13 is installed between the inner ring 7 and the outer ring 6 and at a side of the outer ring 6. When the rolling column 4 is in contact with the inner ring 7 to transfer the power, the rolling column 4 is in contact with one of the two neighboring rolling pin shaft pairs 13 to transmit the power to the rolling pin shaft pairs 13 in clockwise rotation and counter-clockwise rotation. The rolling pin shaft pair 13 drives the outer ring 6 to rotate, and the outer ring 6 drives a planet wheel spoke 3 to rotate, to drive the planocentric set planet wheel to perform translation and implement driving of the a planocentric set. As shown in FIG. 1, the rolling pin shaft pair 13 includes a pin shaft 8 and a cycle of equispaced rolling pins 5 that are disposed in a cylinder 10 and in contact with the cylinder 10, an inner edge of the rolling pin 5 is in contact with an outer edge of the pin shaft 8, and two terminal shafts 9 of the pin shaft 8 are disposed in ⊓-shaped open pores at two ends of the outer ring 6, as shown in FIG. 3. The inner ring 7 is installed on the eccentric shaft 11 through interference fit, or may be connected to the eccentric shaft 11 in structures shown in FIG. 11 and FIG. 12. As shown in FIG. 11 and FIG. 12, the inner ring 7 is connected to the eccentric shaft 11 by using an active key 17, a passive key 18, and springs 16, the active key 17 is fixed on the eccentric shaft 11, the passive key 18 is fixed on the inner ring 7, and two ends of each of the two springs 16 are respectively connected to two side surfaces of the active key 17 and two side surfaces of the passive key 18, to implement buffer driving between the eccentric shaft 11 and the inner ring.

Embodiment 2

The embodiment 2 is shown in FIG. 2, FIG. 4, FIG. 9, and FIG. 10.

A main drive device of a planocentric set for three armed forces is provided. The main drive device mainly includes an inner ring 7, an outer ring 6, a rolling column 4, and rolling pin shaft pairs 13. As shown in FIG. 2, the inner ring 7 is installed on an eccentric shaft 11; the rolling column 4 is installed between the inner ring 7 and the outer ring 6 and at a side closer to the outer ring 6. The rolling pin shaft pair 13 is installed between the inner ring 7 and the outer ring 6 and at a side closer to the inner ring 7. The outer ring 6 is connected to a spoke 3 of a planocentric set planet wheel, and drives the rolling column 4 to rotate. When the rolling column 4 is in contact with the outer ring 6 to transfer power, the rolling column 4 is in contact with one of the two rolling pin shaft pairs 13 to transmit the power to the rolling pin shaft pairs 13 in clockwise rotation and counter-clockwise rotation. The rolling pin shaft pair 13 drives the inner ring 7 to rotate, and the inner ring 7 drives the eccentric shaft 11 to rotate at a high speed, as shown in FIG. 2.

Figure 5:
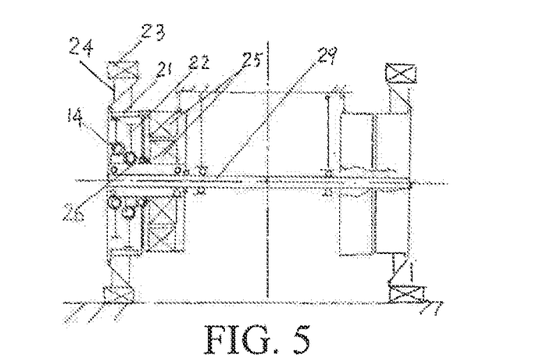
FIG. 5 shows a drive mode of an automobile single wheel—a sectional view of a left wheel loaded with a rolling bearing pair 14 (refer to FIG. 1 for details) and using an engaged pair hollow eccentric wheel coaxial shaft 26 of a planocentric set driven by a high-frequency high-speed alternating electromotor as an active body, and the right wheel is the same as the sectional view of the left wheel.

The rolling pin shaft pair 13 includes a pin shaft 8 and a cycle of equispaced rolling pins (5) that are disposed in a cylinder 10 and in contact with the cylinder 10, as shown in FIG. 5, an inner edge of the rolling pin 5 is in contact with an outer edge of the pin shaft 8, and two terminal shafts 9 of the pin shaft 8 are disposed in ⊔-shaped open pores at two ends of the outer ring 6. The outer ring 6 may be connected to the spoke 3 of the planocentric set planet wheel through interference fit. Alternatively, the outer ring may be connected to the spoke 3 of the planocentric set planet wheel in structures shown in FIG. 9 and FIG. 10. That is, the outer ring 6 is connected to the spoke 3 of the planocentric set planet wheel by using an active key 17, a passive key 18, and springs 16. The active key 17 is fixed on the spoke 3 of the planocentric set planet wheel, the passive key 18 is fixed on the outer ring 6, and two ends of each of the two springs 16 are respectively connected to two side surfaces of the active key 17 and two side surfaces of the passive key 18, to implement buffer driving between the spoke 3 and the outer ring 6.

An application of a rolling bearing device shown in FIGS. 1 and 2 in the present invention in an automobile single wheel drive mode is shown in FIG. 5. FIG. 5 shows a rolling bearing pair 14 (refer to FIG. 1 for details) loaded with an engaging pair hollow eccentric wheel coaxial shaft 26 of a planocentric set driven by a high-frequency high-speed alternating electromotor as an active body.

Figure 6:
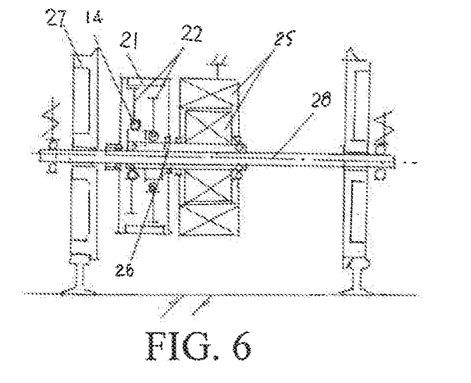
FIG. 6 shows a double-drive mode of high-speed train pair wheels—loaded with a rolling bearing pair 14 (refer to FIG. 1 for details) and using an engaging pair hollow eccentric wheel coaxial shaft 26 of a planocentric set driven by a high-frequency high-speed alternating electromotor as an active body.

FIG. 6 shows a specific structure of the present invention used in high-speed train pair wheel double-drive mode—a rolling bearing pair 14 (refer to FIG. 1 for details) loaded with a planocentric set engaged pair hollow eccentric wheel coaxial shaft 26 driven by a high-frequency high-speed alternating electromotor as an active body.

Figure 7:
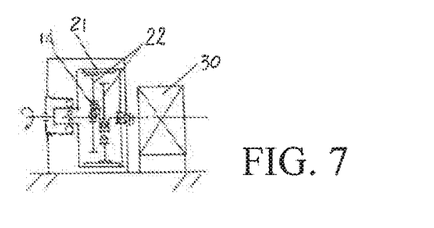
FIG. 7 shows an eccentric wheel of a speed deceleration device of a general-type or helicopter propeller airplane loaded with a rolling bearing pair 14 (refer to FIG. 1 for details)

FIG. 7 shows an application of the present invention in a speed deceleration device for driving a general-type or helicopter propeller airplane and shows a rolling bearing pair 14 (refer to FIG. 1 for details) loaded with an eccentric wheel.

Figure 8:
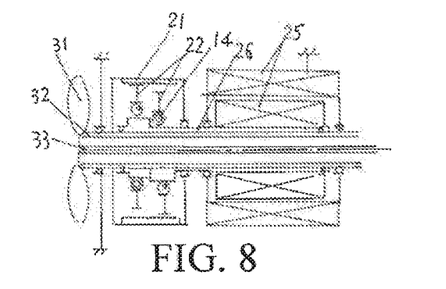
FIG. 8 shows a planocentric set using a hollow eccentric wheel coaxial shaft 26 applied to a hollow main shaft of an adjustment bar 33 of a blade 31 mainly driven by a propeller of a ship or warship loaded with a rolling bearing pair 14 (refer to FIG. 1 for details)
Figure 9:
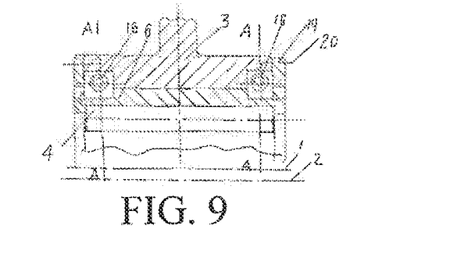
FIG. 9 is an axial sectional view of transferring a torque by an active member by using an outer ring 6 as a passive member loaded with a rolling bearing pair used by a spoke 3 of a planet engaged pair of a planocentric set to the outer ring 6 by using a spring 16.
Figure 10:
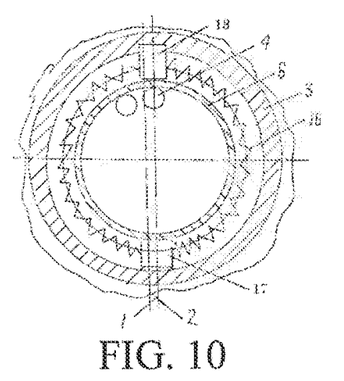
FIG. 10 is a sectional view of FIG. 9 along A-A.

FIG. 8 shows an application of the present invention in a main drive device of a propeller of a ship or warship and shows a hollow eccentric wheel coaxial shaft 26 of a planocentric set applied to a hollow main shaft of an adjustment bar 33 of a blade 31 and loaded with a rolling bearing pair 14 (refer to FIG. 1 for details).

It may be learned from FIG. 5 to FIG. 8 that, a structure of an entire speed deceleration device is revolutionarily simplified by using a bearing for transferring power according to the present invention.

During specific implementation, the service life of the rolling column and the cylinder may be calculated according to a method of an international standard, and the rolling column and the cylinder can be massively produced as a serial product. Preferably, the material of the inner and outer ring may be rolling bearing steel Gr 15. For a process, refer to a production process of a rolling bearing and the geometric tolerance thereof. The rolling column and the rolling pin may use an international standard universal market product. The external diameter of the outer ring may be connected to a pore of the planet wheel spoke through interference fit, or may be connected by using a key. By using a spring buffer device, the rolling column and the rolling pin can operate with each other dynamically. In addition, a dry oil groove may be additionally provided on two cooperation surfaces. The inner ring and a pore of the eccentric wheel cooperate with each other through interference fit or key linkage. When a buffer spring device is used, pore cooperation between the inner ring and the eccentric wheel uses movable cooperation. In addition, thermal refining is performed on an inner gear ring of the dry oil groove additionally provided on a cooperation surface, and a carburized steel quenching and grinding process is performed on the planet wheel gear. The two springs are designed to be spring having both stretching and compression performance. Two ends of the spring are fixedly connected to the key. A sectional surface of a steel wire may be circular, square, ore a rectangular. High-carbon steel quenching or low-temperature tempering is performed on the material, and bluing treatment and chroming are performed on the appearance.

The working principle of the present invention is as follows:

A circumferential component force generated at a left and a right contact point between the rolling column 4 as an active member and the cylinder 10 as a passive member transfers a torque to the passive member. When the active member rotates to the left, left contact points are in contact with each other, and right contact points are in an isolated state to reserve a gap. When the active member rotates to the right, the right contact points are in contact with each other, and the left contact points are in an isolated state to reserve a gap. When the loaded rolling bearing is disposed at a bearing position of a rotating arm of a conventional planocentric set or cycloidal pin wheel, consecutive high-speed rotation is performed around the eccentric shaft 11, and a torque is transferred to the inner ring 7 by using the keys 17 and 18 and the springs 16. The inner ring 7 drives the rolling column 4 and transfers the torque to the outer ring 6. The outer ring 6 and the planet wheel spoke 3 are connected through interference fit or key connection. The planet wheel spoke 3 and the planet wheel perform translation at a high speed, differential rotation is performed on the spoke and the conventional inner gear ring 21, the inner gear ring 21 rotates at a low speed as an output member, thereby forming a speed deceleration device having buffer performance and loaded with the rolling bearing type planocentric set or the cycloidal pin wheel. When it is a speed-acceleration device, an inner gear 21 of a conventional planocentric set or cycloidal pin wheel and the planet wheel spoke 3 that is engaged with the inner gear 21 and that performs translation and differential motion are used as active members, the outer ring 6 are driven by the keys 17 and 18 and the springs 16, the outer ring 6 drives, by using the rolling column 4, the cylinder 10 and the inner ring 7 to rotate. The inner ring 7 and the eccentric shaft are connected through interference fit or key connection, thereby forming a speed-accelerator having a buffer performance and loaded with a rolling bearing device type planocentric set or cycloidal pin wheel.

According to the present invention, only a bearing position of an original rotating arm is occupied, no external force is superposed. In addition, a torque and a radial and axial force may be transferred, and an inner gear ring and a planet wheel shaft is used as active members to transfer the torque to the eccentric wheel 11 to form the speed-acceleration device.

The principle of the buffer device in the present invention is that the inner ring and the outer ring as the active member or the passive member are connected by using respective keys or two circumferential stretching or compression springs, to adapt to working condition requirements in clockwise and counter-clockwise rotation. In addition, a torque is transferred by using the spring. The buffer performance of the spring conforms to the law of conservation of energy. For example, a compression stroke of the spring is 50 mm, and a resilient shape change of a pure positive drive shaft system is $\Delta \leq 1$ mm, and therefore, a compelling force is reduced by 50 times is rotation. This is quite importance to an automobile, a train and an armored vehicle. According to the present invention, the service life of the vehicle can be prolonged.

Parts not related to the present invention are the same as the prior art or may be implemented by using the prior art.

What is claimed is:

1. A main drive device of a planocentric set installed on a bearing position of a planocentric set planet wheel, and directly transferring power of a prime mover to the planet wheel to drive the planet wheel to implement differential rotation, the main drive device comprising:
    an inner ring installed on an eccentric shaft that rotates when driven by the eccentric shaft,
    wherein the eccentric shaft is driven by the prime mover;
    an outer ring;
    a rolling column installed between the inner ring and the outer ring and at a side closer to the inner ring; and
    a rolling pin shaft pair installed between the inner ring and the outer ring and at a side closer to the outer ring, wherein
    when the rolling column is in contact with the inner ring to transfer the power, the rolling column is in contact with one of two adjacent rolling pin shaft pairs to transmit the power to the rolling pin shaft pair in clockwise rotation and counter-clockwise rotation, and the rolling pin shaft pair drives the outer ring to rotate, and
    the outer ring drives a planet wheel spoke to rotate, to drive the planocentric set planet wheel to perform translation, and implement speed-deceleration driving of the planocentric set.

2. The main drive device of a planocentric set according to claim 1,
    wherein the rolling pin shaft pair comprises a pin shaft and a cycle of equally spaced rolling pins that are disposed in a cylinder and in contact with the cylinder, an edge of the rolling pin is in contact with an edge of the pin shaft, and two terminal shafts of the pin shaft are disposed in open pores at two ends of the outer ring.

3. The main drive device of a planocentric set according to claim 2,
    wherein the main drive device is configured to be applied to any one of the following speed deceleration or acceleration devices:
    1) a speed deceleration device powered by a high-frequency high-speed alternating electromotor having a hollow rotor shaft, or a motor that uses a hollow coaxial shaft as a union body and is loaded with a spoke of a rolling bearing-type automobile/armored vehicle, or driven by a gasoline/diesel machine;
    2) a reducer of the planocentric set that is applied to a high-speed train main drive wheel pair powered by a high-frequency high-speed electromotor having a hollow rotor shaft, that uses a hollow motor rotor and an eccentric shaft coaxial shaft of the planocentric set as a union body, and loaded with a rolling bearing pair;
3) a reducer of the planocentric set applied to a propeller of a ship or a warship, having a hollow main shaft, using a high-frequency high-speed electromotor or dynamotor having a hollow rotor shaft and an eccentric shaft coaxial shaft of the planocentric set, loaded with a rolling bearing pair;
4) a serial reducer that is commonly used in a cycloidal pin wheel and loaded with a rolling bearing pair and a general-type serial reducer of the planocentric set;
5) a main drive reducer applied to a propeller of a helicopter and whose impulsion is 20000 rpm, a gas turbine, or a high-speed electromotor;
6) an electrical device, applied to an electrical hub of the planocentric set of an automobile having two gears of speed, formed by a friction pair driven by an inner-and-outer ring electromagnet formed by a hollow coaxial shaft and a radial component of an external diameter of an inner gear ring; or
7) a speed acceleration device of the planocentric set used in a natural wind or wind gathering wind power station.

4. The main drive device of a planocentric set according to claim 1,
wherein the inner ring is installed on the eccentric shaft through interference fit.

5. The main drive device of a planocentric set according to claim 1,
wherein the inner ring is connected to the eccentric shaft by using an active key, a passive key, and springs,
the active key is fixed on the eccentric shaft, the passive key is fixed on the inner ring, and
two ends of each of the two springs are respectively connected to two side surfaces of the active key and two side surfaces of the passive key, to implement buffer driving between the eccentric shaft and the inner ring.

6. The main drive device of a planocentric set according to claim 1,
wherein the outer ring is connected to the spoke of the planocentric set planet wheel through interference fit.

7. The main drive device of a planocentric set according to claim 1,
wherein the outer ring is connected to the spoke of the planocentric set planet wheel by using an active key, a passive key, and springs, and
the active key is fixed on the spoke of the planocentric set planet wheel, the passive key is fixed on the outer ring, and two ends of each of the two springs are respectively connected to two side surfaces of the active key and two side surfaces of the passive key, to implement buffer driving between the spoke and the outer ring.

8. The main drive device of a planocentric set according to claim 1,
wherein the main drive device is configured to be applied to any one of the following speed deceleration or acceleration devices:

1) a speed deceleration device powered by a high-frequency high-speed alternating electromotor having a hollow rotor shaft, or a motor that uses a hollow coaxial shaft as a union body and is loaded with a spoke of a rolling bearing-type automobile/armored vehicle, or driven by a gasoline/diesel machine;
2) a reducer of the planocentric set that is applied to a high-speed train main drive wheel pair powered by a high-frequency high-speed electromotor having a hollow rotor shaft, that uses a hollow motor rotor and an eccentric shaft coaxial shaft of the planocentric set as a union body, and loaded with a rolling bearing pair;
3) a reducer of the planocentric set applied to a propeller of a ship or a warship, having a hollow main shaft, using a high-frequency high-speed electromotor or dynamotor having a hollow rotor shaft and an eccentric shaft coaxial shaft of the planocentric set, loaded with a rolling bearing pair;
4) a serial reducer that is commonly used in a cycloidal pin wheel and loaded with a rolling bearing pair and a general-type serial reducer of the planocentric set;
5) a main drive reducer applied to a propeller of a helicopter and whose impulsion is 20000 rpm, a gas turbine, or a high-speed electromotor;
6) an electrical device, applied to an electrical hub of the planocentric set of an automobile having two gears of speed, formed by a friction pair driven by an inner-and-outer ring electromagnet formed by a hollow coaxial shaft and a radial component of an external diameter of an inner gear ring; or
7) a speed acceleration device of the planocentric set used in a natural wind or wind gathering wind power station.

9. A main drive device of a planocentric set, the main drive device comprising:
an inner ring installed on an eccentric shaft;
an outer ring;
a rolling column installed between the inner ring and the outer ring and at a side closer to the outer ring;
a rolling pin shaft pair installed between the inner ring and the outer ring and at a side closer to the ring, wherein
the outer ring is connected to a spoke of a planocentric set planet wheel, and drives the rolling column to rotate,
when the rolling column is in contact with the outer ring to transfer power, the rolling column is in contact with one of two rolling pin shaft pairs to transmit the power to the rolling pin shaft pair in clockwise rotation and counter-clockwise rotation, and the rolling pin shaft pair drives the inner ring to rotate, and
the inner ring drives the eccentric shaft to rotate at a high speed, to form a speed-acceleration drive device of the planocentric set.

10. The main drive device of a planocentric set according to claim 9,
wherein the rolling pin shaft pair comprises a pin shaft and a cycle of equally spaced rolling pins that are disposed in a cylinder and in contact with the cylinder, an edge of the rolling pin is in contact with an edge of the pin shaft, and two terminal shafts of the pin shaft are disposed in open pores at two ends of the outer ring.

* * * * *